United States Patent

Miley et al.

[15] 3,643,636
[45] Feb. 22, 1972

[54] ENGINE VIBRATION DAMPER

[72] Inventors: Richard Erwin Miley; John Gary Meylink, both of Horicon, Wis.

[73] Assignee: Deere & Company, Moline, Ill.

[22] Filed: June 11, 1970

[21] Appl. No.: 45,436

[52] U.S. Cl. .................... 123/41.69, 123/192 B, 123/193 H, 188/1, 248/3
[51] Int. Cl. ........................................F02b 75/06, F02f 1/30
[58] Field of Search ............... 123/192, 192 B, 195 A, 193 H, 123/198 E, 48 A, 78 A, 41.6, 41.61, 41.67, 41.69, 41.7, 41.52; 248/3, 20; 181/33.01, 33.4; 188/1; 74/574

[56] References Cited

UNITED STATES PATENTS

| | | | |
|---|---|---|---|
| 914,292 | 3/1909 | Leech | 123/41.67 UX |
| 1,171,854 | 2/1916 | Kramer | 123/192 B UX |
| 1,631,100 | 5/1927 | Lauritsen | 188/1 B |
| 1,819,665 | 8/1931 | Wiltse | 248/3 X |
| 1,910,346 | 5/1933 | Marks | 123/41.69 UX |
| 1,987,708 | 1/1935 | Replogle | 181/33.01 UX |
| 2,796,053 | 6/1957 | Lechtenberg | 123/41.67 X |
| 2,978,213 | 4/1961 | Kass | 248/20 |
| 2,998,867 | 9/1961 | Dall | 248/20 X |
| 3,075,619 | 1/1963 | McCandliss | 188/1 B |

*Primary Examiner*—Al Lawrence Smith
*Attorney*—H. Vincent Harsha, Harold M. Knoth, William A. Murray and John M. Nolan

[57] ABSTRACT

A vibration damper for a reciprocating internal combustion engine consisting of a weight rigidly mounted externally on the cylinder head of the engine. The weight, a solid mass of high-density, inert material, has a periphery generally conforming to that of the head, and is mounted thereon by means of the same threaded fasteners used to mount the head on the cylinder. The weight is mounted on the cylinder head in spaced relation thereto to serve also as a cooling air shroud.

5 Claims, 4 Drawing Figures

PATENTED FEB 22 1972 3,643,636

*INVENTORS*
RICHARD E. MILEY
JOHN G. MEYLINK

ENGINE VIBRATION DAMPER

BACKGROUND OF THE INVENTION

The present invention relates generally to a reciprocating internal combustion engine, and more particularly to an apparatus for reducing the operating vibrations transmitted by such an engine to its mounting structure.

The cylinder-crank mechanism utilized in the conventional reciprocating internal combustion engine produces a number of unbalanced inertia or shaking forces which excite undesirable vibrations in the structure mounting the engine. Such vibrations are particularly objectionable when the mounting structure comprises an operator-occupied vehicle, due to the resulting noise and physical discomfort experienced by the operator and the problem is accentuated by the fact that the chassis and many of the parts attached to the chassis of such a vehicle usually have one or more resonant frequencies in the operating speed range of the engine.

There are two principal methods of reducing the vibrations transmitted by an engine to its mounting structure, both well known in the art. The first such method is to employ a balancing mechanism to balance out all or a portion of the shaking forces produced by the engine. The most common mechanism of this type is a counterweight or series of counterweights on the engine crankshaft, although various other devices, such as eccentrically weighted gears or shafts rotatably mounted internally in the engine, are well known. The shaking forces can be substantially reduced with such balancing mechanism, but, for various reasons, they can never be totally eliminated. The vibrations excited in the mounting structure by the remaining unbalanced forces can themselves be substantially reduced, however, through the utilization of resilient engine mounts. This method, also well known in the art, isolates the unbalanced forces and prevents their transmission to the mounting structure.

A combination of these two vibration reducing methods is commonly used in the art to reduce engine vibrations to an acceptable level. In a given engine application, however, considerations other than those of noise and operator comfort may dictate against a maximum utilization of these methods. For example, existing space and cost limitations often limit the balancing mechanism used. In addition, certain advantages, including those in the area of drive mechanism alignment and stability, result from a rigid as opposed to a resilient engine mount. The need is thus apparent for an alternate approach to reducing such vibrations, and in particular to an approach which is within existing space and cost limitations, yet one which permits the engine to be rigidly mounted if so desired.

SUMMARY OF THE INVENTION

It is, accordingly, the primary object of the invention to provide a simple and economical means for reducing the vibrations created by the unbalanced shaking forces of a reciprocating internal combustion engine. It is another object to provide such means which will permit the engine to be rigidly connected to its mounting structure. It is yet another object to provide such means that can be readily added to existing engine applications.

A further object of the invention is to provide a vibration damper for an air-cooled combustion engine having a finned cylinder head, the damper comprising a weight mounted on a series of projections formed in the head and having an adjacent surface disposed in spaced relation to the fins, the weight thereby defining a passage for cooling air perpendicular to the several such passages defined by the fins.

In pursuance of these and other objects, the present invention comprises a weight rigidly mounted externally on the engine, the weight being a shaped mass of high-density, inert material having the sole function of altering the inertia properties of the engine. The invention operates on the principle enunciated in Newton's second law of motion, that is, $F = ma$, where $\kappa F$ is a force produced by the acceleration $a$ of a mass $m$. In terms of the invention, for a constant unbalanced engine force, an increase in the mass of the engine, provided by the mass of the weight, will result in a proportional decrease in the vibrational acceleration transmitted to the engine mounting structure. According to the invention, the weight is detachably mounted on the cylinder head of the engine by means of the same threaded studs used to connect the head to the cylinder.

The invention finds particular utility in existing engine applications where it is desired to reduce the vibrations of an unbalanced, rigidly mounted engine with a minimum alteration of the existing apparatus. A specific example of such an application is one in which the structure mounting the engine has been initially designed for an engine with a relatively heavy accessory, and the accessory is subsequently removed thus altering the inertia properties of the engine and increasing the level of vibration in the mounting structure. The vibration damper of the present invention provides a simple and economical means of reducing such vibrations to their former level without incurring the trouble or expense of redesigning the mounting structure, balancing the engine, or providing the engine with resilient mounts.

BRIEF DESCRIPTION OF THE DRAWINGS

The preferred embodiment of the invention will be described in conjunction with the drawings in which.

DESCRIPTION OF THE PREFERRED EMBODIMENT

Figure 1:
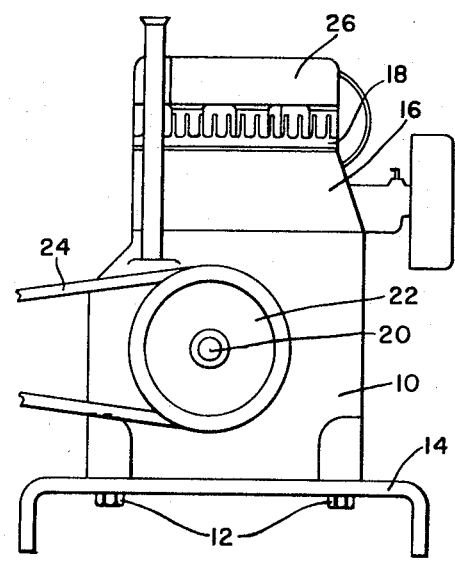
FIG. 1 is a side view of a single-cylinder internal combustion engine equipped with the vibration damper of the present invention.

The invention is illustrated in combination with a conventional internal combustion engine of the single, vertical cylinder type having a crankcase portion or base 10 rigidly connected by means of bolts 12 to a suitable mounting structure 14. The structure 14 may, for example, comprise a portion of the frame or chassis of a small operator-occupied vehicle. Extending vertically from the base 10 is a cylinder portion 16 enclosed at its upper end by a cylinder head 18, the cylinder 16 having an internal bore reciprocally receiving a piston (not shown) therein. The internal mechanism of the engine is of conventional design and further includes a connecting rod (not shown) drivingly connecting the piston with a crankshaft 20. As shown, the crankshaft 20 extends through the side of the base 10 and has a sheave 22 fixed to its outer end and engaging a drive belt 24.

Figure 2:
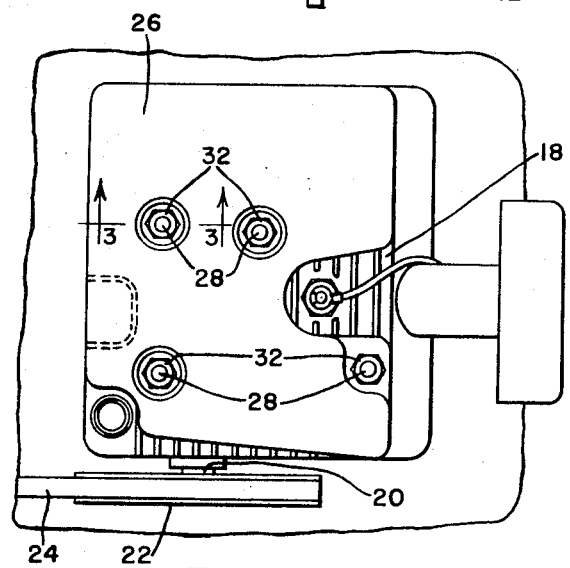
FIG. 2 is an enlarged top view of the engine shown in FIG. 1.

The invention resides in a weight 26 rigidly mounted above the cylinder head 18 by means of four threaded fasteners or studs 28. As shown in FIG. 1, the weight 26 has generally flat upper and lower surfaces, generally vertical sides, and a periphery in the horizontal plane (see FIG. 2) generally conforming to that of the cylinder head 18. The weight rests on four bosses 30 formed in the head 18, each of the bosses, as detailed in FIG. 3, having a hole receiving one of the threaded studs 28. The lower end of each stud is threadably received by the cylinder, while the upper end extends through the weight 26 and threadably engages a nut 32. A recess 34 is formed in the weight around the upper end of the stud and concentric therewith for receiving the nut 32.

Figure 3:
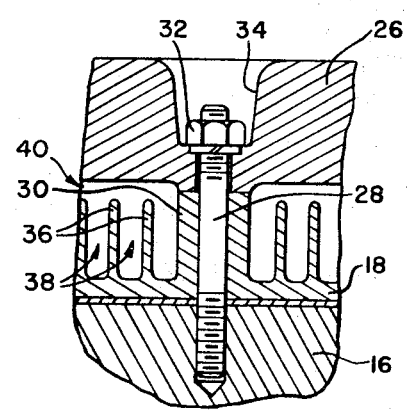
FIG. 3 is an enlarged sectional view taken along the line 3—3 of FIG. 2.

The engine illustrated in the drawings is of the air-cooled type and, as shown best in FIG. 3, the cylinder head 18 thereof is provided with the usual cooling fins 36 defining, in conjunction with the horizontal upper surface of the head, a plurality of parallel passages 38 for cooling air directed across the head by suitable fan structure (not shown) during operation of the engine. The weight 26 is mounted on the bosses 30, the latter extending above the upper edges of the fins 36, in vertical spaced relation to the fins such that the lower horizontal surface thereof defines a cooling air passage 40 perpendicular to and communicating with the several passages 38, the weight thereby facilitating cooling of the cylinder head.

As used herein and in the appended claims, the term "weight" defines a distinct, inert mass of high-density material having the sole function of altering the inertia properties of the engine by increasing the mass thereof. It is to be particularly distinguished from an operatively functional unit associated with the engine and incidentally increasing the mass thereof, such as a pump, starter motor, generator, etc. The particular configuration of the weight is not critical, and can vary according to space limitations in a given application. It has been found that optimum results are obtained by locating the weight on the cylinder head of the engine, at a maximum distance from the engine mounts.

The principle involved in the operation of the weight is that enunciated in Newton's second law of motion, namely, $F = ma$, where $F$ is a force produced by the acceleration $a$ of a mass $m$. For a given shaking force exerted by the engine on its mounting structure, an increase in the effective mass of the engine will thus result in a proportional decrease in the vibrational acceleration transmitted to the structure, and a corresponding decrease in the amplitude of the vibrations excited therein. The relationship between the ratio $A_1/A_o$, where $A_1$ represents the amplitude of vibration of the system including the weight and $A_o$ represents the amplitude of vibration of the system excluding the weight, and the ratio $m_1/m_e$, where $m_1$ represents the mass of the weight and $m_e$ represents the effective mass of the engine excluding the weight, can be derived in the following manner. The engine mounting structure combination can be mathematically approximated as a single degree of freedom system in which $$F(t) = F\sin\omega t = F\sin(2\pi f t)$$

represents the unbalanced force or periodical disturbing force, $K_e$ represents the effective spring constant of the system, $c_e$ represents the effective coefficient of damping of the system, and $m_e$ represents the effective mass or inertia of the engine. For this system, the amplitude $A_o$ of the vibrations excited by the unbalanced force is given by the expression $$A_o = f / \sqrt{(k_e - m_e\omega^2)^2 + 2c_e^2\omega^2}.$$

Assuming $\omega^2 m_e \gg k_e$
and $(\omega^2 m_e)^2 \gg 2c_e\omega^2$,
then $A_o = F/m_e\omega^2$,
or $F = m_e\omega^2 A_o$.

Since $F$ remains constant in the system, the effect thereon of adding an additional mass $m_1$ is given by the expression $$F = (m_e + m_1)\omega^2 A_1,$$

where $A_1$ is the amplitude of vibration of the system including the mass $m_1$. By equating the two immediately preceding expressions, it is apparent that $$A_1/A_o = 1/(1 + m_1/m_e).$$

Figure 4:
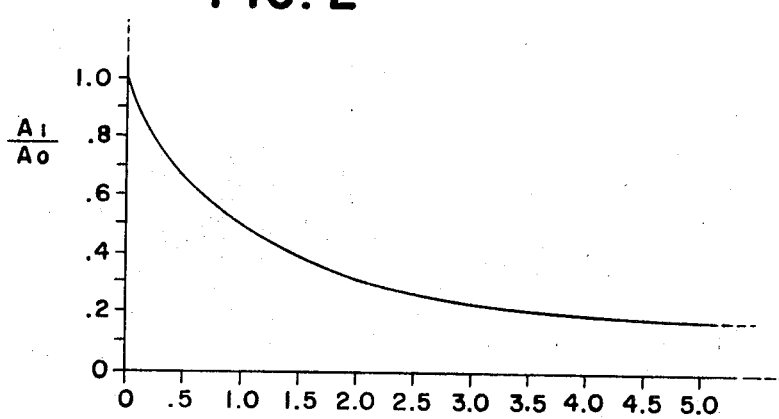
FIG. 4 is a diagram illustrating the relationship between the ratio $A_1/A_o$, where $A_1$ represents the amplitude of vibration of the system including the weight and $A_o$ represents the amplitude of vibration of the system excluding the weight, and the ratio $m_1/m_e$, where $m_1$ represents the mass of the weight and $m_e$ represents the effective mass of the engine excluding the weight.

The plot of this relationship in FIG. 4 reveals that although the total effectiveness of the weight in reducing the ratio $A_1/A_o$ increases as the mass of the weight is increased, at the same time the effectiveness of each additional increment of mass decreases. An optimum value of $m_1$ is thus obtainable for any given system. The derived relationship may be utilized to obtain the required mass $m_1$ for any desired reduction in the amplitude of vibration once a value of $m_e$ for the system has been obtained through experimentation. The value of $m_e$ will vary with a number of factors, among which are the weight distribution and general configuration of the engine mounting structure system. For a conventional single-cylinder engine weighing approximately 94 pounds and having the general configuration illustrated in the drawings, it has been found that a weight of approximately 20 pounds mounted as shown effectively reduces the vibrational acceleration of the engine to approximately one-third of its normal level.

We claim:
1. In combination with an internal combustion engine having a cylinder, a cylinder head enclosing an end of the cylinder and having a plurality of cooling fins extending outwardly therefrom to define a plurality of cooling air passages bounded by the cylinder head and adjacent pairs of fins, a plurality of bosses formed integrally with the cylinder head and extending outwardly therefrom, and a plurality of externally threaded fastener means having enlarged head portions, said fastener means extending through aligned holes in the cylinder and the bosses and engaging mating, internally threaded portions of the cylinder to detachably secure the cylinder head to the cylinder, a vibration damper and cooling air shroud comprising: a weight of substantial thickness seated on the outer ends of the bosses and having an inner surface substantially parallel with and spaced from the outer edges of the fins to define a cooling air passage generally perpendicular to the passages defined by the fins, said weight having a plurality of holes aligned with those in the cylinder and the bosses and receiving the threaded fastener means to detachably secure the weight on the engine, the weight having enlarged recessed areas formed therein around the holes to receive the enlarged head portions of the fastener means, the mass of the weight being of sufficient magnitude to substantially reduce the operating vibrations of the engine.

2. The invention defined in claim 1 wherein the mass of said weight is of sufficient magnitude to reduce the amplitude of the operating vibrations of the engine by at least 20 percent.

3. The invention defined in claim 2 wherein the mass of said weight is of sufficient magnitude to reduce the amplitude of the operating vibrations of the engine by between 20 and 80 percent.

4. The invention defined in claim 1 wherein said weight has an outer periphery generally corresponding to that of the cylinder head.

5. In combination with an internal combustion engine having a cylinder, a cylinder head enclosing an end of the cylinder and having a plurality of cooling fins extending outwardly therefrom to define a plurality of cooling air passages bounded by the cylinder head and adjacent pairs of fins, a plurality of bosses formed integrally with the cylinder head and extending outwardly therefrom, and a plurality of externally threaded fastener means having enlarged head portions, said fastener means extending through aligned holes in the cylinder and the bosses and engaging mating, internally threaded portions of the cylinder to detachably secure the cylinder head to the cylinder, a vibration damper comprising: a weight of substantial thickness seated on the outer ends of the bosses and having an inner surface substantially parallel with and spaced from the outer edges of the fins to define a passage generally perpendicular to the passages defined by the fins, said weight having a plurality of holes aligned with those in the cylinder and the bosses and receiving the threaded fastener means to detachably secure the weight on the engine, the mass of the weight being of sufficient magnitude to reduce the operating vibrations of the engine by at least 20 percent.

* * * * *